United States Patent [19]
Arai et al.

[11] Patent Number: 5,323,374
[45] Date of Patent: Jun. 21, 1994

[54] METHOD OF MAGNETO-OPTICAL RECORDING

[75] Inventors: Masayuki Arai, Tokyo; Hideo Owa, Kanagawa, both of Japan

[73] Assignee: Sony Corporation, Tokyo, Japan

[21] Appl. No.: 11,258

[22] Filed: Jan. 29, 1993

[30] Foreign Application Priority Data

Feb. 5, 1992 [JP] Japan .................. 4-020150

[51] Int. Cl.$^5$ .................. G11B 13/04; G11B 13/00
[52] U.S. Cl. .................. 369/116; 369/13; 369/121; 360/59; 360/114
[58] Field of Search .................. 369/116, 121, 13; 360/59, 114

[56] References Cited

U.S. PATENT DOCUMENTS 4,939,717  7/1990  Ohno et al. .................. 369/116
5,105,400  4/1992  Kikitsu et al. .................. 369/13
5,144,601  9/1992  Maeda et al. .................. 369/13

FOREIGN PATENT DOCUMENTS 0462843  12/1991  European Pat. Off. ...... G11B 11/10
0244443   9/1990  Japan .................. G11B 11/10

Primary Examiner—Paul M. Dzierzynski
Assistant Examiner—David V. Bruce
Attorney, Agent, or Firm—Hill, Steadman & Simpson

[57] ABSTRACT

After a laser beam of a high-level laser beam is applied to a multilayer magneto-optical recording medium to record information thereon, a laser beam of a laser power lower than the laser power of a reading laser beam is applied or substantially no laser beam is applied for a period of time $\tau_0$. If one channel clock period or the period in which the high-level laser beam is of the second laser power is applied is $\tau_w$, then the ratio $R = (\tau_0/\tau_w) \times 100$ is selected to be in the range from 15 to 70%.

1 Claim, 5 Drawing Sheets

METHOD OF MAGNETO-OPTICAL RECORDING

BACKGROUND OF THE INVENTION

1. Field of the Invention

The present invention relates to a method of magneto-optically recording information on a magneto-optical recording medium with an intensity-modulated laser beam.

2. Description of the Prior Art

There have been proposed magneto-optical recording methods capable of overwriting information on multilayer magneto-optical recording mediums with an intensity-modulated laser beam so that newly recorded information replaces the previously recorded information (see, for example, Japanese laid-open patent publications Nos. 62-175948 and 63-52355).

As shown in FIG. 1 of the accompanying drawings, a multilayer magneto-optical recording medium 1, such as a magneto-optical disk, for magneto-optically recording information thereon comprises a transparent substrate 2 such as a glass substrate, a resin substrate, or the like, a dielectric film 3 disposed on one surface of the transparent substrate 2, a recording and reproducing layer 4 and a recording assistance layer 5 with perpendicular magnetic anisotropy which are successively deposited on the dielectric film 3 by way of continuous sputtering or the like, and a protective film 6 such as a nonmagnetic metallic film, a dielectric film, or the like coated on the surface of the recording assistance layer 5.

The recording and reproducing layer 4 may be made of a rare-earth-rich (RE-rich) material such as TbFeCo, for example, which has a large coercive force $H_{C1}$ at normal temperature $T_R$ (ranging from $-20°$ to $60°$ C.) and a low Curie temperature $T_{C1}$. The recording assistance layer 5 may be made of a transition-metal-rich (TM-rich) material such as GdTbFeCo, for example, which has a small coercive force $H_{C2}$ at normal temperature $T_R$ and a high Curie temperature $T_{C2}$.

Information is recorded on the magneto-optical recording medium 1 as follows: As shown in FIG. 2 of the accompanying drawings, the recording assistance layer 5 is magnetized in an upward direction as indicated by the arrows, and the recording and reproducing layer 4 is magnetized in upward and downward directions as indicated by the arrows. The layers 4, 5 which are magnetized in the upward direction are combined in a first state $ST_A$, and the layers 4, 5 which are magnetized in the downward and upward directions, respectively, are combined in a second state $ST_B$. The first and second states $ST_A$, $ST_B$ serve to represent the recorded information "0" and the recorded information "1", respectively.

A process of recording the information "0" on the magneto-optical recording medium 1 which is in either the first state $ST_A$ or the second state $ST_B$ will be described below. First, a laser beam having a first laser power $P_L$ which is sufficient to achieve a temperature $T_{ER}$ that is higher than the Curie temperature $T_{C1}$ of the recording and reproducing layer 4 and lower than the Curie temperature $T_{C2}$ of the recording assistance layer 5, is applied to the magneto-optical recording medium 1 for a predetermined period of time to bring the recording and reproducing layer 4 into a third state $ST_C$ in which the direction of magnetization is unstable.

Thereafter, the magneto-optical recording medium 1 is cooled on its own accord thereby to enable the exchange force acting in the boundary between the layers 4, 5 to orient the direction of magnetization of the recording and reproducing layer 4 in the same upward direction as the recording assistance layer 5. In this manner, the magneto-optical recording medium 1 is brought from the first state $ST_A$ representing "0" or the second state $ST_B$ representing 1"' to the first state $ST_A$ representing "0".

To record the information "1" on the magneto-optical recording medium 1 which is in either the first state $ST_A$ or the second state $ST_B$, the magneto-optical recording medium 1 is irradiated for a predetermined period of time with a laser beam having a second laser power $P_H$, higher than the first laser power $P_L$, which is sufficient to achieve a temperature $T_{REC}$ that is close to the Curie temperature $T_{C2}$ of the recording assistance layer 5. At the same time, a downward recording magnetic field $H_{REC}$ ranging from 300 to 500 Oe, for example, higher than the coercive force $H_{CR}$ of the recording assistance layer 5 at the temperature $T_{REC}$ is applied to the magneto-optical recording medium 1.

Now, the magneto-optical recording medium 1 is brought into a fourth state $ST_D$ in which the direction of magnetization of the recording and reproducing layer 4 is unstable and the recording assistance layer 5 is magnetized downwardly. Thereafter, the magneto-optical recording medium 1 is cooled on its own accord, enabling the exchange force acting in the boundary between the layers 4, 5 to orient the direction of magnetization of the recording and reproducing layer 4 in the same downward direction as the recording assistance layer 5. Such a magnetized condition of the layers 4, 5 is referred to as a fifth state $ST_E$.

Thereafter, an upward initializing magnetic field $H_{ini}$ ranging from 3 to 5 kOe which is smaller than the coercive force $H_{C1}$ of the recording and reproducing layer 4 at the normal temperature $T_R$ and larger than the coercive force $H_{C2}$ of the recording assistance layer 5 at the normal temperature $T_R$ is applied to the magneto-optical recording medium 1 to orient the direction of magnetization of only the recording assistance layer 5 upwardly. In this manner, the magneto-optical recording medium 1 is brought from the first state $ST_A$ representing "0" or the second state $ST_B$ representing "1" to the second state $ST_B$ representing "1".

According to the above magneto-optical recording process, the direction of magnetization of the layers 4, 5 can be controlled into an upward or downward direction by controlling the intensity of the laser power. Therefore, using a single laser beam, new information can be overwritten directly on the magneto-optical recording medium 1 to replace the old recorded information, without any separate process of erasing the old recorded information.

In the above magneto-optical recording process, the magneto-optical recording medium 1 is always irradiated with either the laser beam of the first low-level laser power $P_L$ to record "0" or the laser beam of the second high-level laser power $P_H$ to record "1" while erasing the previously recorded information. Therefore, the temperature distribution of the magneto-optical recording medium 1 which is irradiated with pulses of the laser beam tends to be in a broader range than it is according to a general magneto-optical recording process in which only the laser beam of the second laser power $P_H$ is switched on and off.

More specifically, it is assumed that after the laser beam of the second laser power $P_H$ is applied to the magneto-optical recording medium 1 to record the information "1", the laser beam of the first laser power $P_L$ is applied to record erase the recorded information, i.e., to record the information "0". The laser beam of the first laser power $P_L$ is applied before a region around the pit in the magneto-optical recording medium 1 whose temperature has been increased by the laser beam of the second laser power $P_H$ is sufficiently cooled down. At this time, due to the thermal interference between the laser beams, the recording and reproducing layer 4 tends to be heated to a temperature that exceeds the Curie temperature $T_{C1}$ at which the direction of magnetization of the recording and reproducing layer 4 is unstable, and that is close to the Curie temperature $T_{C2}$ of the recording assistance layer 5.

When information is overwritten according to the conventional magneto-optical recording process, pits formed in the recording and reproducing layer 4 is liable to be irregular in configuration, resulting in a poor C/N ratio, i.e., higher noise. If two adjacent pits are closely spaced from each other, it is difficult to recognize the pits separately, and hence the error rate is increased.

The region of the magneto-optical recording medium 1 which is irradiated with the laser beam of the first laser power $P_L$ is thermally affected to a different degree depending on the interval at which the laser beam of the second laser power $P_H$ is applied. Since the region of the magneto-optical recording medium 1 is thermally affected to a different degree, an optimum range of the first laser power $P_L$ varies with the result that the range (margin) of the first laser power $P_L$ which is optimum for various laser pulse intervals becomes narrow.

While it is necessary to set the low-level laser power $P_L$ accurately to a constant level, it is actually difficult to select such a constant level and set the laser power to the selected constant level. The narrow margin for the low-level laser power is responsible for an increase in the BER (Byte Error Rate).

In an attempt to eliminate the above drawbacks, there has been proposed a magneto-optical recording process as disclosed in Japanese laid-open patent publication No. 2-244443. According to the disclosed magneto-optical recording process, desired information is magneto-optically recorded on a magneto-optical recording medium with an intensity-modulated laser beam, and the laser beam is turned off for a predetermined period of time $\tau_0$ following the application of the laser beam of the high-level laser power $P_H$.

OBJECTS AND SUMMARY OF THE INVENTION

It is an object of the present invention to provide a method of magneto-optically recording information on a magneto-optical recording medium with an intensity-modulated laser beam which is turned off for a predetermined period of time $\tau_0$ following the application of a laser beam of a high-level laser power $P_H$, the method being capable of reliably and stably increasing a power margin for a laser beam of a low-level laser power $P_L$ for recording information.

According to the present invention, there is provided a method of magneto-optically recording information on a multilayer magneto-optical recording medium with an intensity-modulated laser beam, comprising the steps of applying a laser beam of a first low-level laser power and a laser beam of a second high-level laser power to the multilayer magneto-optical recording medium to record information thereon, applying a laser beam of a third laser power lower than the first laser power to the multilayer magneto-optical recording medium to read the recorded information therefrom, and either applying a laser beam of a fourth laser power lower than the third laser power to the multilayer magneto-optical recording medium or substantially turning off the laser beam during a predetermined period of time $\tau_0$ following the application of the laser beam of the second laser power, the ratio of $(\tau_0/\tau_w) \times 100$ being in the range from 15 to 70% where $\tau_w$ is one channel clock period or the period in which the laser beam of the second laser power is applied.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 3:
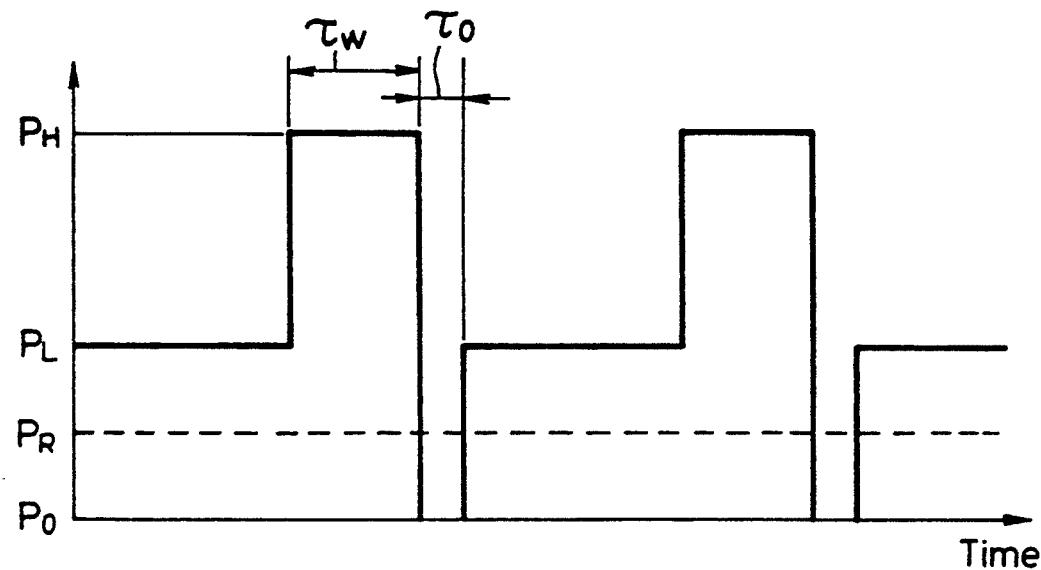
FIG. 3 is a diagram of a programmed pattern of laser power used in a method according to the present invention.

According to the present invention, as shown in FIG. 3 of the accompanying drawings, a laser beam of a first low-level laser power $P_L$ and a laser beam of a second high-level laser power $P_H$ are applied to a multilayer magneto-optical recording medium to record information thereon, and a laser beam of a third laser power $P_R$ lower than the first laser power $P_L$ is applied to the multilayer magneto-optical recording medium to read the recorded information therefrom. During a predetermined period of time $\tau_0$ following the application of the laser beam of the second high-level laser power $P_H$, a laser beam of a fourth laser power $P_0$ lower than the third laser power $P_R$ is applied to the multilayer magneto-optical recording medium, or the laser beam is substantially turned off.

If one channel clock period in which the laser beam of the second high-level laser power $P_H$ is applied is $\tau_w$, then the ratio R of the period $\tau_0$ to the period $\tau_w$, $R=(\tau_0/\tau_w)\times 100$, is in the range from 15 to 70%.

As described above, after the laser beam of the second high-level laser power $P_H$ is applied to the multilayer magneto-optical recording medium, the laser beam of the fourth laser power $P_0$ lower than the third laser power $P_R$ is applied for the period $\tau_0$. Therefore, the multilayer magneto-optical recording medium is prevented from being excessively heated, and it is possible to effectively avoid the thermal interference between the laser beams of the laser powers $P_L$, $P_H$, allowing pits to be formed in proper configuration and at proper intervals for recording information. When the ratio R of the period $\tau_0$ to the period $\tau_w$ is in the range from 15 to 70%, in particular, the margin of the low-level laser power $P_L$ is high enough to overwrite information optimally and reliably.

If the ratio R were smaller than 15%, then the laser beams of the laser powers $P_L$, $P_H$ applied to the multilayer magneto-optical recording medium would cause mutual thermal interference thereon. If the ratio R were higher than 70%, information would not sufficiently be recorded, i.e., the previously recorded information would not sufficiently be erased, with the laser beam of the low-level power $P_L$. When the ratio R is in the range of $15 \leq R \leq 70\%$, the above problems are solved, and the BER is improved and the power margin of the laser power $P_L$ is widened.

As described above with reference to FIG. 1, a multilayer magneto-optical recording medium 1, such as a magneto-optical disk, for magneto-optically recording information thereon according to the method of the present invention comprises a transparent substrate 2 made of glass, PC (polycarbonate) or the like, a dielectric layer 3 made of SiN, for example, disposed on one surface of the transparent substrate 2 for the Kerr enhancement effect, a recording and reproducing layer or memory layer 4 made of GdFeCo or the like disposed on the dielectric layer 3, a recording assistance layer 5 made of TbFeCo or the like disposed on the recording and reproducing layer 4 with an intermediate layer (not shown) interposed, if necessary, and a protective layer 6 made of SiN or the like disposed on the recording assistance layer 5. These layers 3, 4, 5, 6 are successively deposited on the transparent substrate 2 by way of continuous sputtering.

Figure 2:
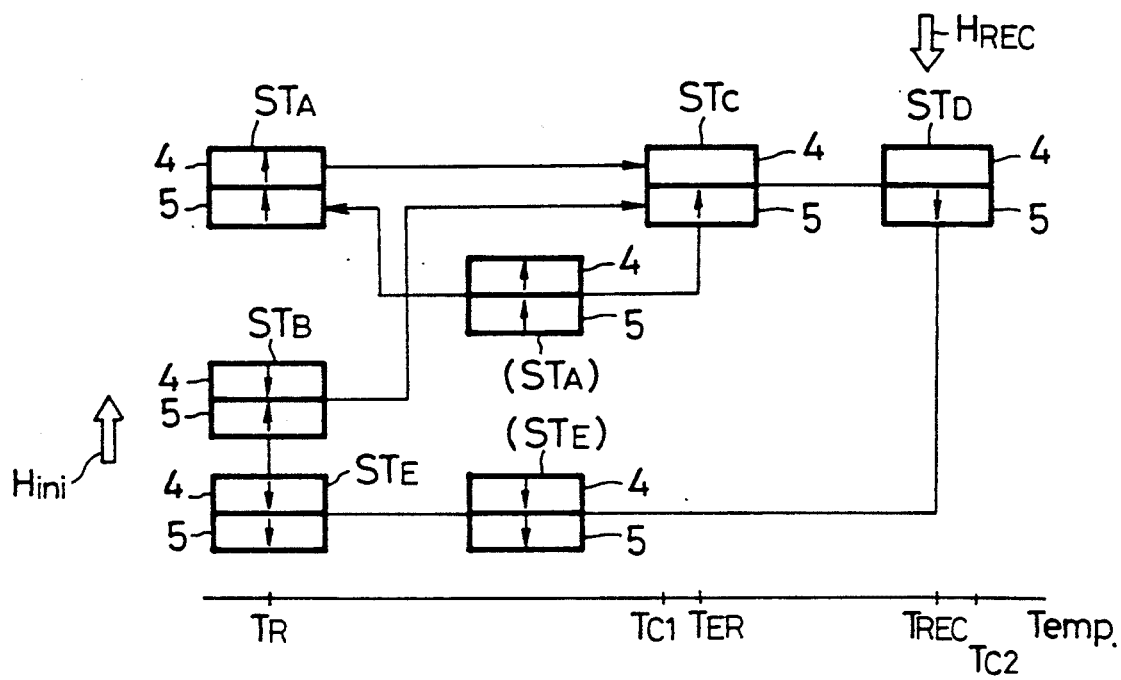
FIG. 2 is a diagram illustrative of an overwrite process to which the present invention is applicable.

Binary information of "0" and "1" is recorded on the magneto-optical recording medium 1 according to the process shown in FIG. 2. More specifically, the laser beam of the first low-level laser power $P_L$ is applied to the magneto-optical recording medium 1 to reach the temperature $T_{ER}$ close to the Curie temperature $T_{C1}$ of the recording and reproducing layer 4 thus producing the state $ST_C$. Thereafter, the magneto-optical recording medium 1 is cooled of its own accord to allow the recording and reproducing layer 4 to be magnetized in the same direction as the recording assistance layer 5, thus achieving the state $ST_A$ to record the information "0" or erase the previously recorded information. The laser beam of the second high-level laser power $P_H$ is applied to the magneto-optical recording medium 1 to reach the temperature $T_{REC}$ close to the Curie temperature $T_{C2}$ of the recording assistance layer 5, and also the recording magnetic field $H_{REC}$ is applied, thereby producing the state $ST_D$. Subsequently, the magneto-optical recording medium 1 is cooled of its own accord to generate the state $ST_E$. The external initializing magnetic field $H_{ini}$ of 2 kOe, for example, is applied to reverse the magnetization of only the recording assistance layer 5 of low coercive force at the normal temperature which may range from $-20°$ to $60°$. Only the recording assistance layer 5 is initialized to achieve the state $ST_B$, thus recording the information "1".

The information "0", "1" thus recorded on the magneto-optical recording medium 1 is read or reproduced as follows: The laser beam of the third laser power $P_R$ lower than the low-level laser power $P_L$ is applied to the magneto-optical recording medium 1 to produce a magneto-optical interaction, i.e., a Kerr rotation, due to the direction of magnetization depending on the information "1" or "0" recorded in the recording and reproducing layer 4. The recorded information is read or reproduced by detecting the Kerr angle from a laser beam reflected by the magneto-optical recording medium 1.

Figure 4:
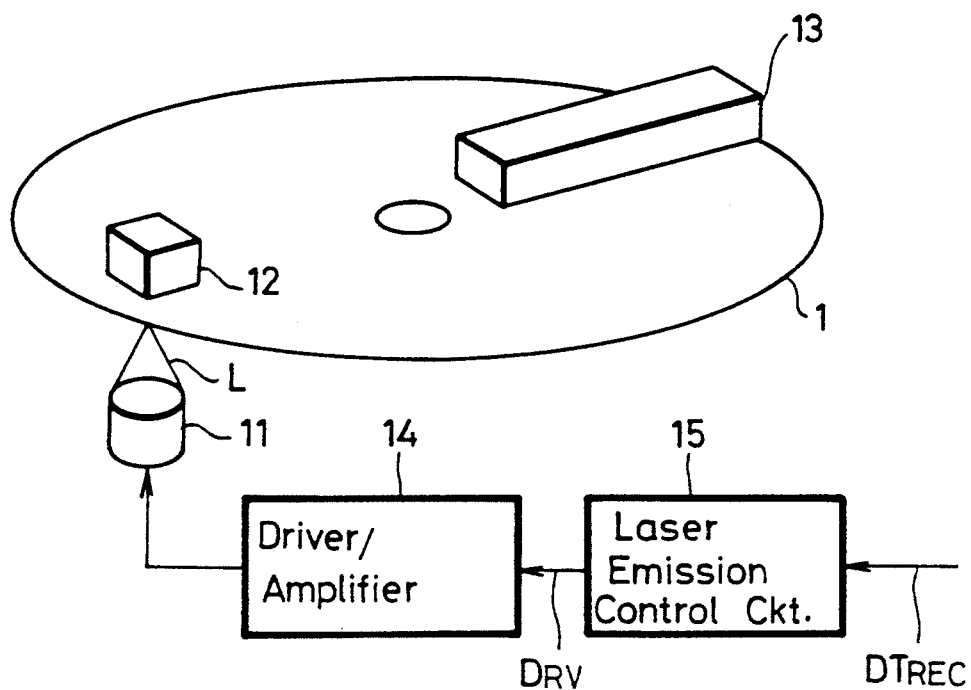
FIG. 4 is a schematic perspective view, partly in block form, of a magneto-optical recording device used to carry out the method according to the present invention.

A magneto-optical recording device used to carry out the method according to the present invention for magneto-optically recording information with an intensity-modulated laser beam is schematically shown in FIG. 4.

As shown in FIG. 4, the magneto-optical recording device has an optical pickup 11 positioned beneath the reverse side of the multilayer magneto-optical recording medium 1 for applying a laser beam L thereto. A magnet 12 for generating the recording magnetic field $H_{REC}$ is disposed above the face side of the multilayer magneto-optical recording medium 1 in alignment with the optical pickup 11.

The magneto-optical recording device also has a magnet 13 for generating the initializing magnetic field $H_{ini}$, the magnet 13 being positioned above the face side of the multilayer magneto-optical recording medium 1 in substantially 180°-spaced relationship to the magnet 12.

The optical pickup 11 is energized to emit the laser beam by a laser drive signal $D_{RV}$ which is supplied from a laser emission control circuit 15 through a driver/amplifier 14.

When recording data $DT_{REC}$ supplied to the laser emission control circuit 15 is "0", the laser emission control circuit 15 generates a laser drive signal $D_{RV}$ for applying the laser beam L of the first low-level laser power $P_L$ for a predetermined period of time to heat the magneto-optical recording medium 1 to the temperature $T_{ER}$ that is higher than the Curie temperature $T_{C1}$ of the recording and reproducing layer 4 and lower than the Curie temperature $T_{C2}$ of the recording assistance layer 5.

When recording data $DT_{REC}$ supplied to the laser emission control circuit 15 is "1", the laser emission control circuit 15 generates a laser drive signal $D_{RV}$ for applying the laser beam L of the second high-level laser power $P_H$ for a predetermined period of time to heat the magneto-optical recording medium 1 to the temperature $T_{REC}$ that is higher than the Curie temperature $T_{C2}$ of the recording assistance layer 5.

After the laser beam L of the second high-level laser power $P_H$ is applied in response to recording data $DT_{REC}$ of "1", and before the laser beam L of the first low-level laser power $P_L$ is applied to record recording data $DT_{REC}$ of "0", the laser emission control circuit 15 generates a laser drive signal $D_{RV}$ of the third laser power $P_0$ lower than the first laser power $P_L$ for the predetermined period $\tau_0$, thereby substantially turning off the laser beam L for the predetermined period $\tau_0$.

Consequently, when the laser beam L of the first low-level laser power $P_L$ is to be applied to record recording data $DT_{REC}$ of "0" on the magneto-optical recording medium 1 after the laser beam L of the second high-level laser power $P_H$ is applied in response to recording data $DT_{REC}$ of "1", the laser beam L of the first low-level laser power $P_L$ can be applied to a region around the pit where "1" is recorded after the region is cooled down reliably to the Curie temperature $T_{C1}$ at which the direction of magnetization of the recording and reproducing layer 4 is unstable.

Since the magneto-optical recording medium 1 is held to the temperature $T_{ER}$ that is higher than the Curie temperature $T_{C1}$ at which the direction of magnetization of the recording and reproducing layer 4 is unstable, and lower than the Curie temperature $T_{C2}$ of the recording assistance layer 5, pits can be formed in proper configuration and at proper intervals in the recording and reproducing layer 4.

The region of the magneto-optical recording medium 1 where the laser beam L of the first laser power $P_L$ is applied is prevented from suffering thermal fluctuations which would otherwise be brought about by different times in which the laser beam L of the second high-level laser power $P_H$ is applied. Consequently, the margin of the first laser power $P_L$ which is optimum for various laser pulse intervals is relatively wide.

Consequently, new information can be recorded and old information can be erased, i.e., information can be overwritten, highly reliably with the laser beam of the first laser power.

Figure 5:
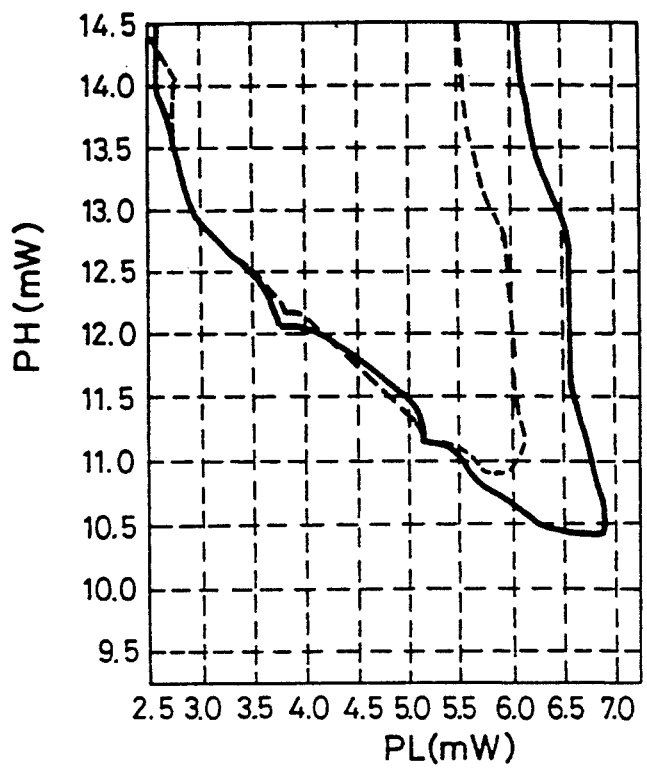
FIG. 5 is a diagram showing measured overwrite power ranges for a conventional recording process and the method according to the present invention.
Figure 6:
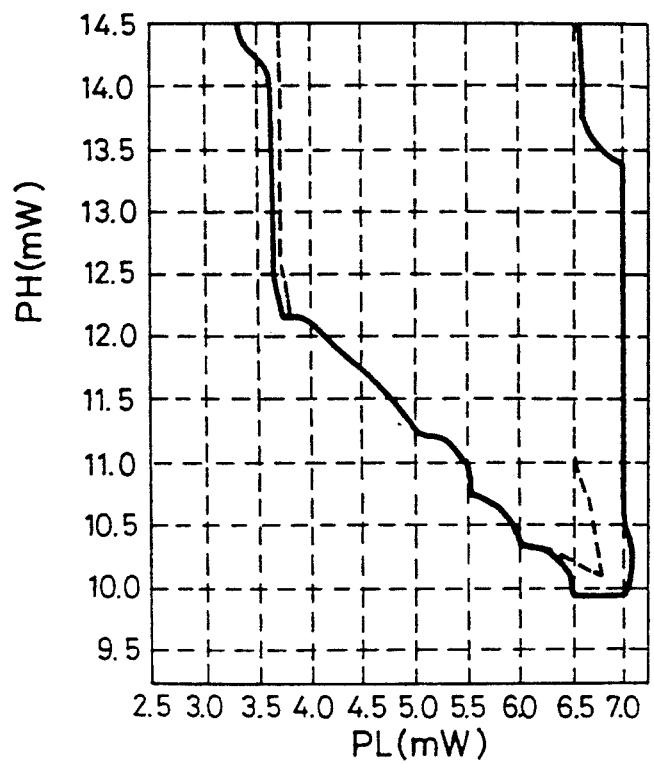
FIG. 6 is a diagram showing measured overwrite power ranges for a conventional recording process and the method according to the present invention.

Ranges surrounded by solid-line curves in FIGS. 5 and 6 are measured ranges of the high- and low-level laser powers $P_H$, $P_L$ capable of overwriting information with BER being below $5 \times 10^{-4}$. In the measurements shown in FIGS. 5 and 6, $\tau_w = 52$ ns, $\tau_0 = 10$ ns, the reading laser power $P_R = 1.6$ mW, $H_{ini} = 2.5$ kOe, and $H_{REC} = 400$ Oe.

Broken-line curves in FIGS. 5 and 6 show measured results according to a conventional method where $\tau_0 = 0$. The laser beam of the low-level laser power $P_L$ is applied for about 100 ns and about 370 ns respectively in the measurements shown in FIGS. 5 and 6. The measurements shown in FIGS. 5 and 6 were obtained at the position of a radius of 30 mm on a multilayer magneto-optical disk having a diameter of 130 mm which was rotated at 2400 rpm when a 2,7 RLL (Run Length Limited) signal was applied with a channel clock signal of 18.5 MHz.

In each of FIGS. 5 and 6, it can be seen that the range (area) in which information can well be recorded is increased by substantially turning off the laser beam, i.e., inserting the off-time $\tau_0$, immediately after the recording of information with the laser beam of the high-level laser power $P_H$, and that the margin of the low-level laser power $P_L$ is widened.

Results of measurements with different off-times $\tau_0$ under the otherwise same conditions as those of FIGS. 5 and 6 are shown in FIGS. 7 through 10. The BER was $BER \leq 5 \times 10^{-4}$ in ranges surrounded by solid-line curves in FIGS. 7 through 10.

Figure 7:
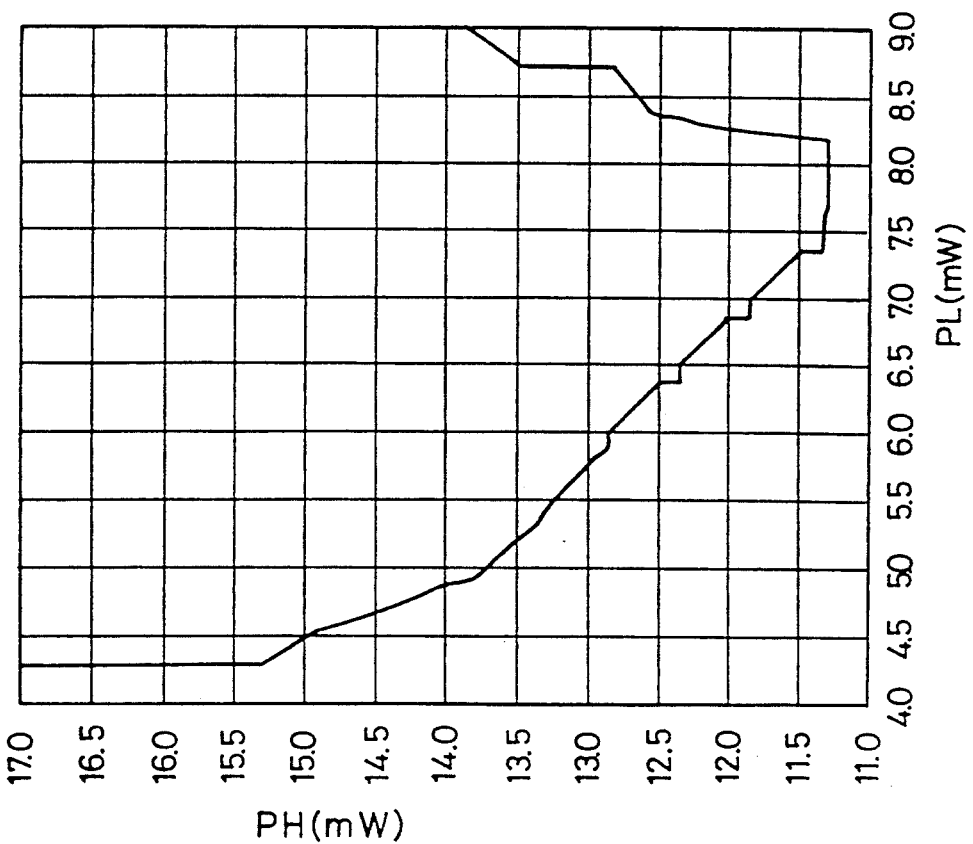
FIG. 7 is a diagram showing measured overwrite power ranges for the method according to the present invention.
Figure 8:
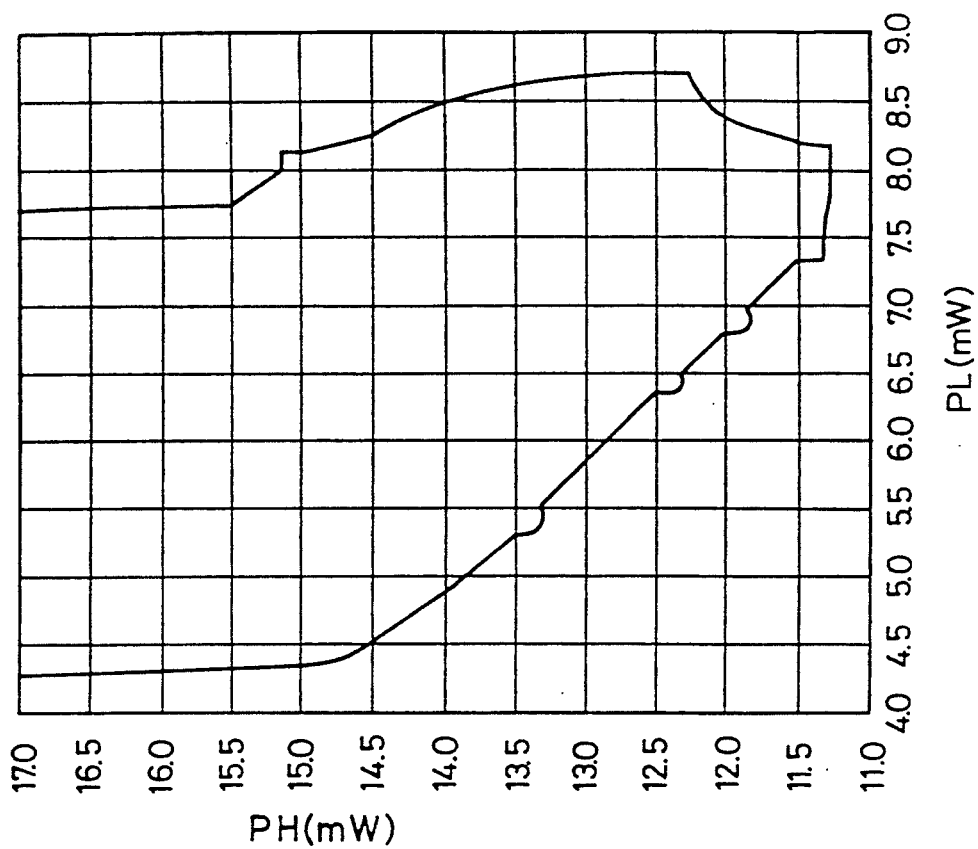
FIG. 8 is a diagram showing measured overwrite power ranges for the method according to the present invention.
Figure 10:
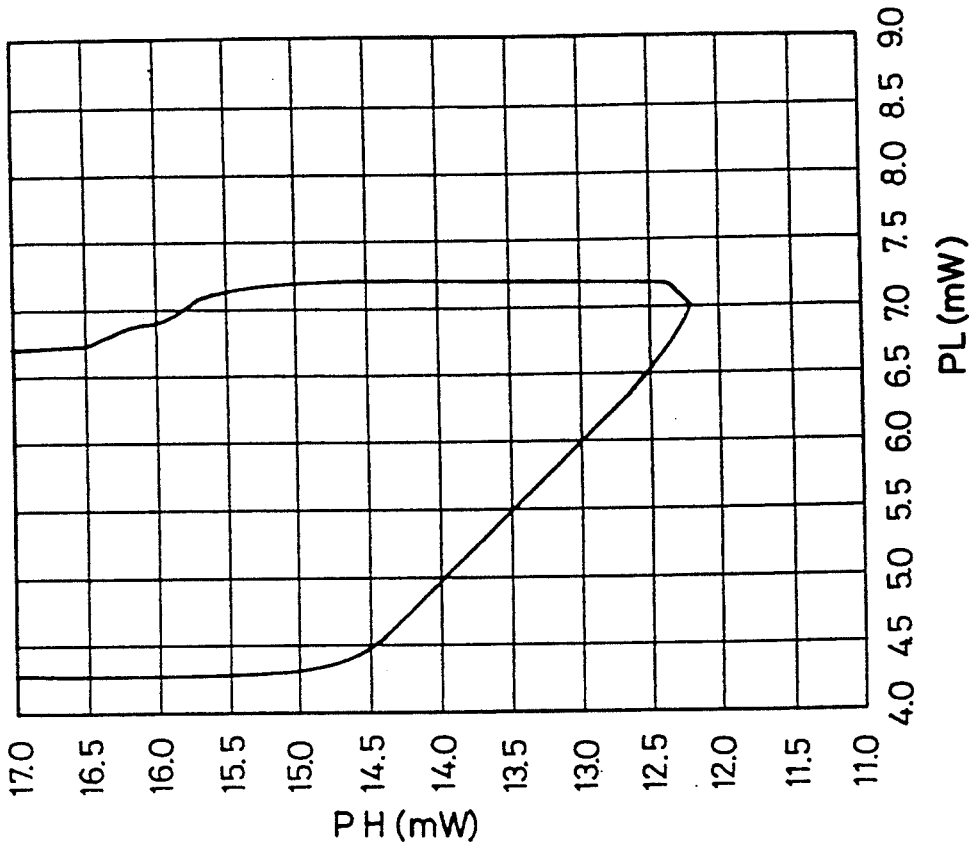
FIG. 10 is a diagram showing measured overwrite power ranges for a conventional recording method.
Figure 9:
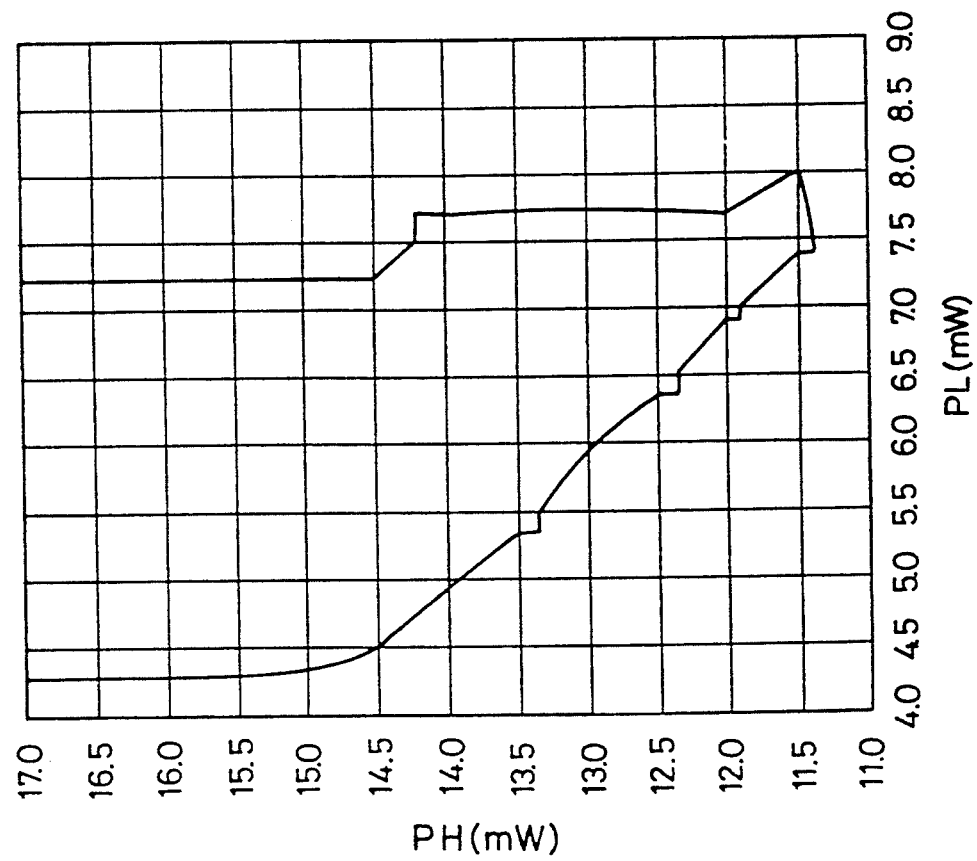
FIG. 9 is a diagram showing measured overwrite power ranges for the method according to the present invention.

In FIG. 7, $\tau_0 = 31$ nsec. and $R = 59.6\%$. In FIG. 8, $\tau_0 = 21$ nsec. and $R = 40.3\%$. In FIG. 9, $\tau_0 = 11$ nsec. and $R = 21\%$. In FIG. 10, $\tau_0 = 0$, i.e., a conventional recording method was employed.

The results shown in FIGS. 7 through 10 indicate that the ranges or areas in which information can well be recorded, and particularly the margin of the low-level laser power $P_L$, in FIGS. 7 through 9 are greater than those in FIG. 10.

It was observed in FIGS. 7 through 9 that when R was smaller than 15%, almost no increase in the power margin was seen compared with FIG. 10, and when R was greater than 70%, the erasure of previously written information with the low-level power $P_L$ was insufficient.

While the recording of binary information "0" and "1" has been described above, the principles of the present invention are not limited to the recording of binary information, but applicable to the recording of multi-valued information.

Figure 1:
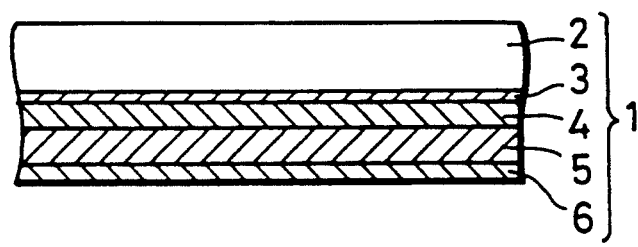
FIG. 1 is a fragmentary cross-sectional view of a magneto-optical recording medium used in the present invention.

The magneto-optical recording medium 1 used in the present invention is not limited to the structure shown in FIG. 1, but may be of any of various other configurations such as a magneto-optical recording medium having a metal layer of Al or the like.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method of magneto-optically recording information on a multilayer magneto-optical recording medium with an intensity-modulated laser beam having different levels of laser power comprising the steps of;

applying a laser beam of a first low-level laser power and a laser beam of a second high-level laser power to the multilayer magneto-optical recording medium to record information thereon;

applying a laser beam of a third laser power lower than said first low-level laser power to the multilayer magneto-optical recording medium to read the recorded information therefrom; and applying a laser beam of a fourth laser power in a range between zero power and a power lower than said third laser power to the multilayer magneto-optical recording medium during a predetermined period of time to $\tau_0$ following the application of the laser beam of the second high-level laser power, the ratio of $(\tau_0/\tau_w) \times 100$ being in the range from 15 to 70% where $\tau_w$ is a period selected from one channel clock period and a period in which said laser beam of the second high-level laser power is applied so that the beam of the first low-level laser power has a wide power margin.

* * * * *